March 26, 1957   W. A. LEDWITH   2,786,648
BLADE LOCKING DEVICE
Filed April 4, 1950
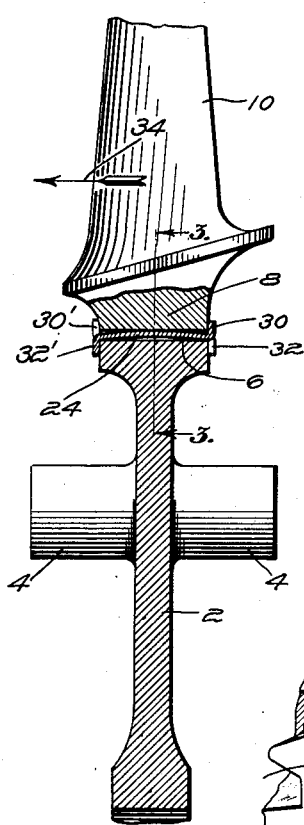
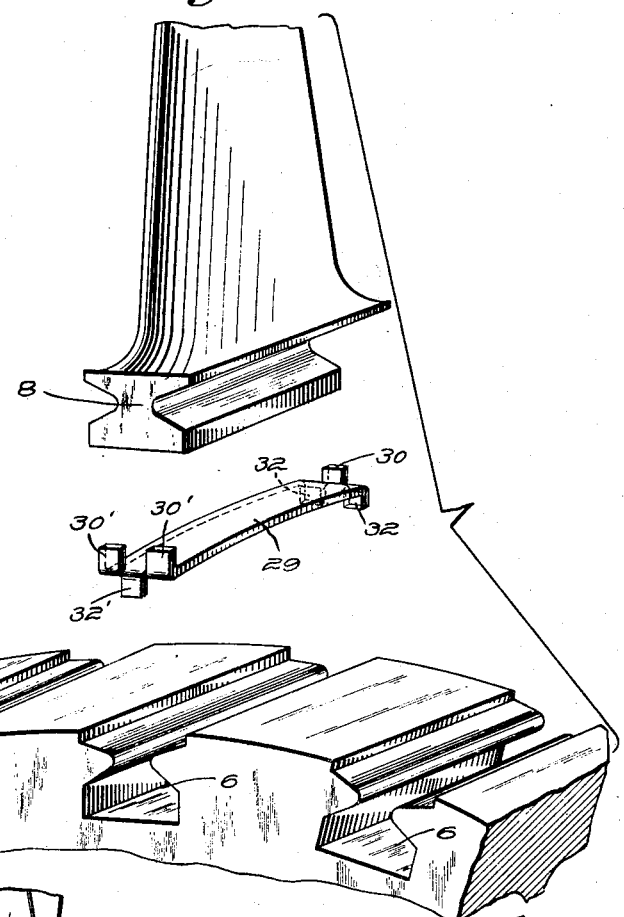
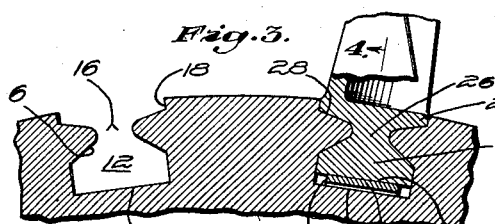
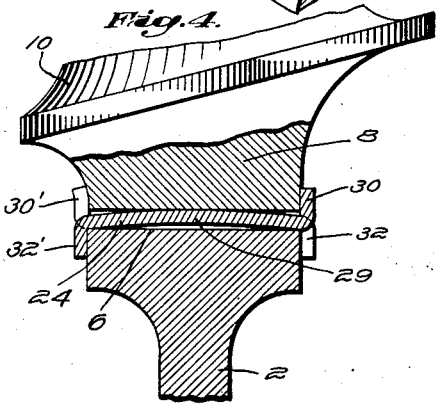
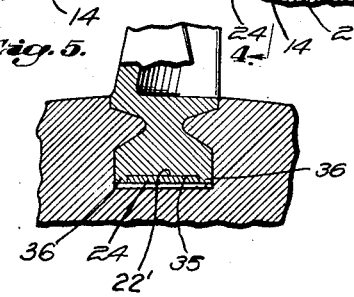
Inventor
Walter A. Ledwith
by Charles A. Warren
Attorney

United States Patent Office 2,786,648
Patented Mar. 26, 1957

2,786,648

BLADE LOCKING DEVICE

Walter A. Ledwith, Glastonbury, Conn., assignor to United Aircraft Corporation, East Hartford, Conn., a corporation of Delaware Application April 4, 1950, Serial No. 153,795

3 Claims. (Cl. 253—77)

This invention relates to a device for locking blades in position in a supporting disc and is especially adapted for use in the rotors of axial flow compressors or turbines.

When the supporting disc has a number of axially extending recesses in its periphery to receive the roots of blades which project radially outward from the disc, it becomes necessary to prevent axial movement of the blade relative to the disc because of the axial thrust exerted on the blade during operation of the compressor or turbine. The blades have been locked in the disc by forming tabs on opposite ends of the blade root with one of the tabs in such a position that the blade root may be inserted in the properly formed slot in the disc and the tab subsequently bent down against the side of the disc. The projecting tabs on the blade root make more difficult the machining of the blade root surfaces and in many cases the material of the blade does not bend readily and breakage of the tab from the blade root frequently occurs. This is especially true in the event of removal and reinsertion of the blade since the tab frequently cannot be re-bent successfully. A feature of this invention is an arrangement for locking the blade in postiion by the use of separate replaceable member engagable with the disc and blade root and which requires no machining operation on the disc to make it usable.

Instead of the integral tab lock above mentioned the blades have been held against axial movement by staking the blade to the disc. Such an arrangement complicates removal of the blade and inevitably causes damage to either the blade root or to the disc such that additional machining is required before the blade can be reassembled. A feature of the invention is the arrangement for locking the blade by a separate locking member which is inexpensive to manufacture and which may be replaced if damaged each time that a blade is removed and reassembled.

Kroon Patent No. 2,434,935 shows a separate locking member for gas turbine blades which requires a machining operation both on the blade root and in the slot in the disc. One of the features of the present invention is the simplification of the lock construction to minimize the modification necessary in both disc and blade root. Another feature of the invention is an arrangement for holding the blade radially outward in the slot in the disc by means of the blade lock.

Other objects and advantages will be apparent from the specification and claims, and from the accompanying drawings which illustrate an embodiment of the invention.

Fig. 1 is an axial sectional view through a disc showing the blade lock.

Fig. 2 is an exploded perspective view of a section of the disc periphery with the blade root and lock and showing the relative positions of the parts.

Fig. 3 is a sectional view along the line 3—3 of Fig. 1.

Fig. 4 is a view along the line 4—4 of Fig. 3 showing the blade lock on a larger scale than Fig. 1.

Fig. 5 is a sectional view similar to Fig. 3 showing a modification.

The invention is shown in conjunction with a compressor disc for use in a multistage axial flow compressor construction but it will be apparent that the invention is equally applicable to the fastening of blades in the discs of axial flow turbines or other similar apparatus. In the arrangement shown, the compressor disc 2, which may have axially projecting flanges 4 thereon for spacing the disc 2 from an adjacent similar disc for another stage of the compressor, has a plurality of slots 6 in its periphery to receive the similarly formed root 8 of the blade 10. The particular shape of the blade root or of the similarly shaped slot 6 is not critical and for the purpose of the present invention a slot is shown having a relatively broad base opening 12 the base surface 14 of which is substantially flat, a narrow neck 16 and a broad outer end portion 18. The narrow neck 16 constitutes an outer peripheral portion of the slot radially outward of the base opening. The blade root is similar in shape having a broad base portion 20 the base surface 22 of which is substantially flat and is preferably of such a dimension as to leave, when the blade root is assembled in the slot, a clearance space of substantially uniform depth between the surface 22 and the surface 14 for the insertion of the blade lock 24. The blade root has a narrow neck portion 26 and a broader portion 28 radially outward from the neck portion to engage in the broad outer end 18 of the slot 6.

As best shown in Figs. 1 and 4, the blade lock is in a form of a thin flat strip 29 which is several times wider than its thickness and which extends in an axial direction within the slot between the base surface 14 of the slot and the base surface 22 of the blade root. In a direction transversely of the strip the latter is parallel to the base surfaces of the blade root and slot, and these surfaces are preferably at right angles to a radius of the disc extending centrally through the slot. Under centrifugal force the strip engages flatwise against the base surface of the blade root. The strip is long enough to provide material projecting beyond the ends of the slot to form tabs 30 and 32 at one end of the slot and tabs 30' and 32' at the other end, the tabs 30 and 30' extending outwardly to overlie the ends of the blade root and the tabs 32 and 32' extending downwardly or radially inwardly to overlie the sides of the disc. It is obvious that only one tab may be provided to be bent up against the end of the blade root and another tab to be bent downwardly against the surface of the disc. To prevent twisting of the lock in the slot the width of the strip is several times greater than the thickness, as shown.

Because of the axial thrust exerted on the blade during the operation of the machine in which the disc is incorporated, however, this thrust being, in the particular arrangement shown, in the direction of the arrow 34, it has been found advantageous to provide three tabs at each end of the lock. At the end of the lock which resists the thrust by engagement with the disc (the right-hand end in the arrangement shown), a single tab 30 is bent upwardly against the blade root and the other two tabs 32 at the same end of the lock are bent down since these two tabs must resist the thrust exerted by the gas forces on the blade. At the opposite end of the blade lock (the left-hand end in the arrangement shown) it has two upwardly projecting tabs 30' since these tabs must resist the axial thrust on the blade. The same end of the lock is shown with only a single downwardly extending tab 32'. It will be understood that, in mounting a blade, it will be possible to have all of the tabs prebent except the single tab 30. With this arrangement the blade lock would be inserted in the slot in the disc, the blade would be axially inserted in the slot over the lock and then the tab 30 would be bent up into position.

With a blade lock of this character it has been found that the blades may be held tightly within the slots by making the blade lock of resilient material and providing a longitudinal bow in the blade lock between its ends, as shown in Figs. 1 and 4, such that the blade is urged radially outward at all times thereby urging the base of the blade root securely into the narrow neck portion of the slot.

The invention is shown in a type of blade and disc construction in which the slots 6 do not extend parallel to the axis of the disc but rather at an oblique angle thereto as best shown in Fig. 2. In certain installations with the slots extending obliquely in this manner the axial thrust exerted by the blade on the blade lock tends to place a bending moment on the blade lock which may cause it to twist within the bottom of the slot. Where the lock is of sufficient width it is obvious that this difficulty will not occur. In some cases, however, it may be advantageous to provide for securely retaining the lock in position against twisting by providing, as shown in Fig. 5, a base surface 22' the major portion of which is substantially flat, as in Figs. 1–4, being flat for its entire length and for substantially the entire width except for the spaced axially extending ribs 36 along opposite side edges to define a wide slot 35. The slot is of such a width that the lock will fit securely therein and will not thereby twist out of proper locking position. Obviously the slot 35 must be large enough to provide sufficient clearance for sliding the blade root of this figure with the locking device thereon through the slot. That is to say, the clearance between the base surface 22' of the root and the base surface of the slot is substantially the same as in Figs. 1–3, inclusive. It may be noted that in most cases it is advantageous to have the blade lock as wide as possible with respect to the base surface of the slot in the disc.

It is to be understood that the invention is not limited to the specific embodiment herein illustrated and described, but may be used in other ways without departure from its spirit as defined by the following claims.

I claim:

1. In elastic fluid apparatus, a rotor disc having root receiving slots extending substantially transversely of the disc at its periphery, and blades having roots corresponding substantially in shape to and engaging in said slots, the major portion at least of the base surface of the root being flat and the base surface of the slot also being flat and radially spaced from the base surface of the root to define therebetween a clearance space of uniform depth over said major portion, in combination with locking means for holding each of said roots against endwise movement in its slot comprising a wide flat strip of material positioned in said clearance space beneath the blade root, said strip projecting beyond the blade root and slot at both ends of the slot and having a plurality of projecting tabs at each end out of the plane of the strip, one tab at each end engaging the end of the root and another tab at each end engaging the side of the disc, said strip being resilient at least in the central portion and being bowed longitudinally between its ends to hold the root securely in the slot.

2. In elastic fluid apparatus, a rotor disc having root receiving slots extending substantially transversely of the disc at its periphery, each slot having a base surface, and blades having roots engaging in said slots, each root having a base surface a portion of each of the slots radially outward of the base surface being narrower than the base surface thereof to retain the blade in the slot in position radially of the disc, in combination with locking means for holding each of said roots in its slot comprising a flat strip of material on the base surface of each of said slots with a plurality of projecting tabs on each end of the strip, one tab at each end engaging with the end of the blade root and another tab at each end engaging with the side of the disc, the major portion of the base surface of the blade root being substantially flat and the base surface of the slot also being substantially flat and radially spaced from the base surface of the root to define a clearance space of substantially uniform depth for the major portion of the width of the base surfaces, said base surface on the root having projecting ribs adjacent opposite edges thereof and extending radially inward toward the base surface of the slot to define, between the base surfaces of the root and slot, a wide flat groove extending in a direction axially of the disc and receiving said blade locking strip, the width of the strip being substantially greater than the thickness of the strip and the width of the strip being substantially equal to the width of the groove.

3. In elastic fluid apparatus, a rotor disc having root receiving slots extending substantially transversely of the disc at its periphery, each slot having a base surface, and blades having roots corresponding substantially in shape to and engaging in said slots, each root having a base surface the major portion at least of the base surface of the root being substantially flat and the base surface of the slot also being substantially flat and spaced radially from the base surface of the root to define therebetween a clearance space of substantially uniform depth for substantially the width of said major portion of the base surface of the root, a portion of each of the slots radially outward of the base surface being narrower than the base surface thereof to retain the blades in position radially with respect to the disc, in combination with locking means for holding each of said roots against endwise movement in its slot comprising a substantially flat strip of material of substantial width positioned in said clearance space beneath the blade root, said strip projecting beyond the blade root and slot at both ends of the slot and having a plurality of projecting tabs at each end out of the plane of the strip, at least one tab at each end engaging the end of the root and at least one tab at each end engaging the side of the disc, each of said blades when the rotor construction is in operation having an axial thrust exerted thereon, and the tabs which resist the axial thrust of the blade with respect to the slot being more in number than the other tabs, the base surface on the root having projecting ribs adjacent opposite side edges thereof projecting radially inward toward the base surface of the slot to define a wide flat groove therebetween extending in a direction axially of the slot and receiving the blade locking strip, the latter being substantially equal in width to the width of the groove.

References Cited in the file of this patent

UNITED STATES PATENTS

| | | |
|---|---|---|
| 952,317 | Eyermann | Mar. 15, 1910 |
| 1,149,658 | London | Aug. 10, 1915 |
| 2,434,935 | Kroon | Jan. 27, 1948 |
| 2,534,125 | Hayes | Dec. 12, 1950 |

FOREIGN PATENTS

| | | |
|---|---|---|
| 10,902 | Great Britain | May 9, 1910 |
| 15,893 | Great Britain | July 27, 1908 |
| 29,680 | Netherlands | Mar. 15, 1933 |
| 124,821 | Switzerland | Mar. 1, 1928 |
| 620,877 | Great Britain | Mar. 31, 1949 |